(12) United States Patent
Spiegel

(10) Patent No.: US 8,914,752 B1
(45) Date of Patent: Dec. 16, 2014

(54) APPARATUS AND METHOD FOR ACCELERATED DISPLAY OF EPHEMERAL MESSAGES

(71) Applicant: Snapchat, Inc., Pacific Palisades, CA (US)

(72) Inventor: Evan Spiegel, Pacific Palisades, CA (US)

(73) Assignee: Snapchat, Inc., Venice, CA (US)

( * ) Notice: Subject to any disclaimer, the term of this patent is extended or adjusted under 35 U.S.C. 154(b) by 0 days.

(21) Appl. No.: 13/973,770

(22) Filed: Aug. 22, 2013

(51) Int. Cl.
| | |
|---|---|
| *G06F 3/033* | (2013.01) |
| *G06F 3/0488* | (2013.01) |
| *G06F 3/044* | (2006.01) |
| *G06F 3/0481* | (2013.01) |
| *G06F 3/01* | (2006.01) |
| *H04W 4/12* | (2009.01) |
| *H04W 4/14* | (2009.01) |

(52) U.S. Cl.
CPC ............... *G06F 3/044* (2013.01); *G06F 3/017* (2013.01); *G06F 3/0488* (2013.01); *H04W 4/12* (2013.01); *H04W 4/14* (2013.01); *G06F 3/0481* (2013.01)
USPC ............................ 715/863; 715/256; 455/466

(58) Field of Classification Search
CPC ... G06F 3/04883; G06F 3/017; G06F 3/0481; G06F 3/0488; H04W 4/12; H04W 4/14
USPC .................................. 715/863, 256; 455/466
See application file for complete search history.

(56) References Cited

U.S. PATENT DOCUMENTS

| | | | | |
|---|---|---|---|---|
| 2008/0313346 | A1* | 12/2008 | Kujawa et al. ................ | 709/236 |
| 2009/0042588 | A1* | 2/2009 | Lottin et al. .................. | 455/466 |
| 2010/0131880 | A1* | 5/2010 | Lee et al. ...................... | 715/769 |
| 2010/0223343 | A1* | 9/2010 | Bosan et al. .................. | 709/206 |
| 2010/0306669 | A1* | 12/2010 | Della Pasqua ................ | 715/752 |
| 2012/0184248 | A1* | 7/2012 | Speede ......................... | 455/411 |
| 2013/0063369 | A1* | 3/2013 | Malhotra et al. .............. | 345/173 |
| 2013/0194301 | A1* | 8/2013 | Robbins et al. ............... | 345/629 |
| 2013/0222323 | A1* | 8/2013 | McKenzie .................... | 345/174 |
| 2014/0032682 | A1* | 1/2014 | Prado et al. ................... | 709/206 |

\* cited by examiner

*Primary Examiner* — William Bashore
*Assistant Examiner* — James F Sugent
(74) *Attorney, Agent, or Firm* — Cooley LLP

(57) ABSTRACT

An electronic device comprises a display and an ephemeral message controller to present on the display an ephemeral message for a transitory period of time. A touch controller identifies haptic contact on the display during the transitory period of time. The ephemeral message controller terminates the ephemeral message in response to the haptic contact.

9 Claims, 3 Drawing Sheets

APPARATUS AND METHOD FOR ACCELERATED DISPLAY OF EPHEMERAL MESSAGES

FIELD OF THE INVENTION

This invention relates generally to the display of ephemeral messages. More particularly, this invention relates to techniques for accelerated display of ephemeral messages.

BACKGROUND OF THE INVENTION

Ephemeral messaging may rely on a timer to determine the length of viewing time for content. For example, a message sender may specify the length of viewing time for the message recipient. When receiving a set of timed content to be viewed sequentially, sometimes the set viewing period for a given piece of content can exceed the viewing period desired by the message recipient. That is, the message recipient may want to terminate the current piece of content to view the next piece of content.

In view of the foregoing, it would be desirable to provide techniques for accelerated viewing of ephemeral messages.

SUMMARY OF THE INVENTION

An electronic device comprises a display and an ephemeral message controller to present on the display an ephemeral message for a transitory period of time. A touch controller identifies haptic contact on the display during the transitory period of time. The ephemeral message controller terminates the ephemeral message in response to the haptic contact.

A non-transitory computer readable storage medium comprises instructions executed by a processor to present on a display an ephemeral message for a transitory period of time. The ephemeral message is terminated in response to a haptic contact signal applied to the display during the transitory period of time.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
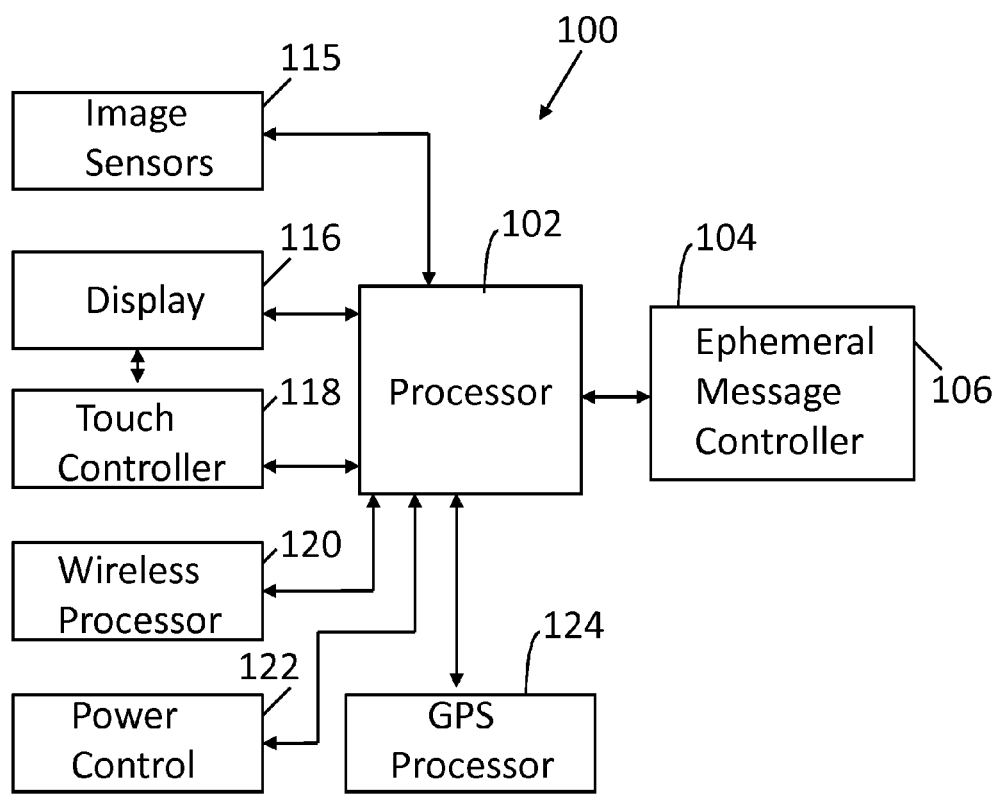
FIG. 1 illustrates components of an electronic device implementing accelerated display of ephemeral messages in accordance with the invention.

FIG. 1 illustrates an electronic device 100 implementing operations of the invention. In one embodiment, the electronic device 100 is a smartphone with a processor 102 in communication with a memory 104. The processor 102 may be a central processing unit and/or a graphics processing unit. The memory 104 is a combination of flash memory and random access memory. The memory 104 stores an ephemeral message controller 106 to implement operations of the invention. The ephemeral message controller 106 includes executable instructions to accelerate display of ephemeral messages. An ephemeral message may be a text, an image, a video and the like. The display time for the ephemeral message is typically set by the message sender. However, the display time may be a default setting or a setting specified by the recipient. Regardless of the setting technique, the message is transitory.

The processor 102 is also coupled to image sensors 115. The image sensors 115 may be known digital image sensors, such as charge coupled devices. The image sensors capture visual media, which is presented on display 116.

A touch controller 118 is connected to the display 116 and the processor 102. The touch controller 118 is responsive to haptic signals applied to the display 116. In one embodiment, the ephemeral message controller 106 monitors signals from the touch controller 118. If haptic contact is observed by the touch controller 118 during the display of an ephemeral message, then the display of the existing message is terminated and a subsequent ephemeral message, if any, is displayed. In one embodiment, two haptic signals may be monitored. A continuous haptic signal may be required to display a message, while an additional haptic signal may operate to terminate the display of the message. For example, the viewer might tap the screen with a finger while maintaining haptic contact with another finger. This causes the screen to display the next piece of media in the set. In one embodiment, the haptic contact to terminate a message is any gesture applied to any location on the display 116. In another embodiment, the haptic contact is any gesture applied to the message itself. In one embodiment, the gesture is un-prompted (i.e., there is no prompt such as "Delete" to solicit an action from the user). In another embodiment, the gesture may be prompted (e.g., by supplying a "Delete" option on the display, which must be touched to effectuate deletion).

The electronic device 100 may also include other components commonly associated with a smartphone, such as a wireless signal processor 120, a power control circuit 122 and a global positioning system processor 124. While many of components of FIG. 1 are known in the art, new functionality is achieved through the ephemeral message controller 106.

Figure 2:
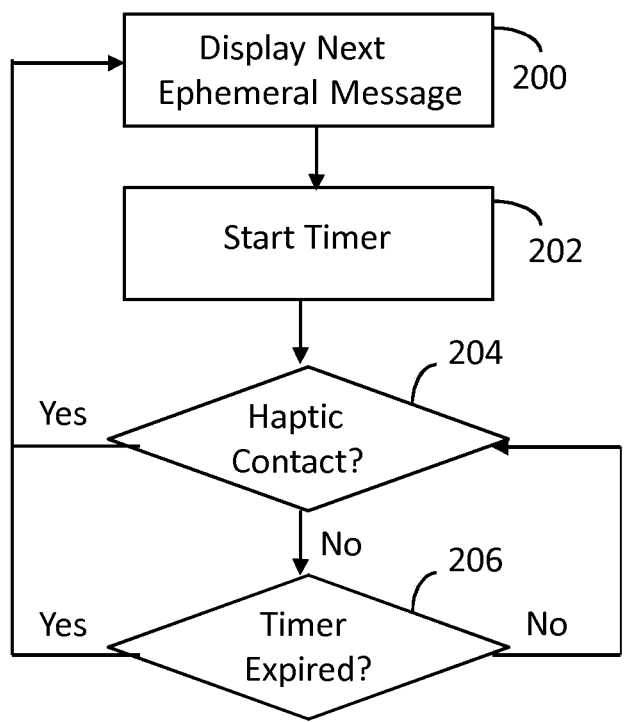
FIG. 2 illustrates processing operations associated with an embodiment of the invention.

FIG. 2 illustrates processing operations associated with the ephemeral message controller 106. Initially, an ephemeral message is displayed 200. A timer is then started 202. The timer may be associated with the processor 102.

Haptic contact is then monitored 204. If haptic contact exists (204—Yes), then the current message is deleted and the next message, if any, is displayed 200. If haptic contact does not exist (204—No), then the timer is checked 206. If the timer has expired (206—Yes), then the current message is deleted and the next message, if any, is displayed 200. If the timer has not expired (206—No), then another haptic contact check is made 204. This sequence between blocks 204 and 206 is repeated until haptic contact is identified or the timer expires.

Figure 3:
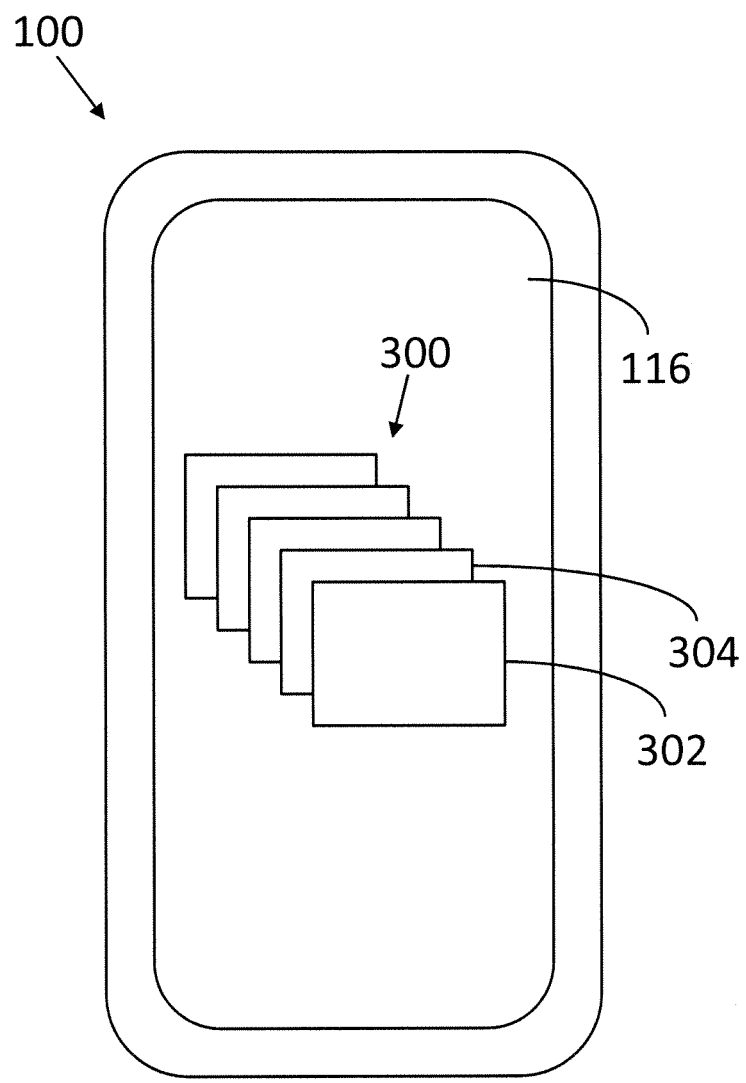
FIG. 3 illustrates the exterior of an electronic device implementing accelerated display of ephemeral messages in accordance with the invention.

FIG. 3 illustrates the exterior of electronic device 100. The figure also illustrates the display 116. The display 116 presents a set of ephemeral messages 300 available for viewing. A first message 302 may be displayed. Upon expiration of the timer, a second message 304 is displayed. Alternately, if haptic contact is received before the timer expires the second message 304 is displayed.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An ephemeral message controller with instructions executed by a processor to:
   present on a display indicia of a set of ephemeral messages available for viewing;
   present on the display a first ephemeral message of the set of ephemeral messages for a first transitory period of time defined by a timer, wherein the first ephemeral message is deleted when the first transitory period of time expires;
   receive from a touch controller a haptic contact signal indicative of a gesture applied to the display during the first transitory period of time;
   wherein the ephemeral message controller deletes the first ephemeral message in response to the haptic contact signal and proceeds to present on the display a second ephemeral message of the set of ephemeral messages for a second transitory period of time defined by the timer, wherein the ephemeral message controller deletes the second ephemeral message upon the expiration of the second transitory period of time;
   wherein the second ephemeral message is deleted when the touch controller receives another haptic contact signal indicative of another gesture applied to the display during the second transitory period of time; and
   wherein the ephemeral message controller initiates the timer upon the display of the first ephemeral message and the display of the second ephemeral message.

2. The ephemeral message controller of claim 1 wherein the ephemeral message controller displays an ephemeral message in response to persistent haptic contact on the display.

3. The ephemeral message controller of claim 1 wherein the transitory period of time is specified by a message sender.

4. The ephemeral message controller of claim 1 wherein the gesture is received without a prompt on the display.

5. The ephemeral message controller of claim 1 wherein the gesture is received in response to a prompt on the display.

6. A non-transitory computer readable storage medium, comprising instructions executed by a processor to:
   present on a display indicia of a set of ephemeral messages available for viewing;
   present on the display a first ephemeral message of the set of ephemeral messages for a first transitory period of time defined by a timer, wherein the first ephemeral message is deleted when the first transitory period expires;
   receive a haptic contact signal indicative of a gesture applied to the display during the first transitory period of time;
   delete the first ephemeral message in response to the gesture applied to the display during the first transitory period of time;
   present a second ephemeral message from the set of ephemeral messages on the display in response to the gesture for a second transitory period of time defined by the timer, wherein the second ephemeral message is deleted when the second transitory period expires;
   receive a second haptic contact signal indicative of a second gesture applied to the display during the second transitory period of time;
   delete the second ephemeral message in response to the second gesture applied to the display during the second transitory period of time; and
   initiate the timer upon the display of the first ephemeral message and the display of the second ephemeral message.

7. The non-transitory computer readable storage medium of claim 6 further comprising instructions executed by the processor to display the ephemeral message in response to persistent haptic contact on the display.

8. The non-transitory computer readable storage medium of claim 6 wherein the transitory period of time is specified by a message sender.

9. The non-transitory computer readable storage medium of claim 6 wherein the haptic contact is any gesture applied to any location on the display.

* * * * *